US011942764B1

(12) United States Patent
Czekala et al.

(10) Patent No.: US 11,942,764 B1
(45) Date of Patent: Mar. 26, 2024

(54) SPARK PLUG FOR BOOSTED ENGINE

(71) Applicant: Ford Global Technologies, LLC, Dearborn, MI (US)

(72) Inventors: Michael Czekala, Canton, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/332,260

(22) Filed: Jun. 9, 2023

Related U.S. Application Data

(62) Division of application No. 18/047,525, filed on Oct. 18, 2022, now Pat. No. 11,742,636.

(51) Int. Cl.
*H01T 13/36* (2006.01)
*H01T 13/38* (2006.01)
*F02P 9/00* (2006.01)

(52) U.S. Cl.
CPC ............ *H01T 13/36* (2013.01); *H01T 13/38* (2013.01); *F02P 9/002* (2013.01)

(58) Field of Classification Search
CPC ........... H01T 13/36; H01T 13/38; F02P 9/002
USPC ........................... 123/169 P, 169 PA, 169 PH
See application file for complete search history.

(56) References Cited

U.S. PATENT DOCUMENTS 1,714,463 A 5/1929 Holroyd
3,145,319 A 8/1964 Ross
3,389,287 A 6/1968 Wolcott
3,832,586 A 8/1974 Podiak
3,882,341 A 5/1975 Green
4,059,782 A 11/1977 Lentz
4,193,012 A 3/1980 Podiak et al.
5,463,267 A 10/1995 Conway
9,391,430 B2 7/2016 Berkemeier et al.
10,066,594 B2 9/2018 Steiner et al.
11,066,980 B1 7/2021 Leone et al.
11,512,624 B1 11/2022 Leone et al.
11,742,636 B1 * 8/2023 Czekala ................. H01T 13/38 313/144
2020/0072142 A1 3/2020 Kolhouse et al.

FOREIGN PATENT DOCUMENTS

EP 3560049 B1 12/2020
WO 2018104681 A1 6/2018

OTHER PUBLICATIONS

"DENSO Spark Plug," DENSO Website, Available Online at https://www.denso.com/global/en/products-and-services/automotive-service-parts-and-accessories/plug/basic/heatrange/, Available as Early as May 22, 2019, 3 pages.

* cited by examiner

*Primary Examiner* — Hai H Huynh
(74) *Attorney, Agent, or Firm* — Vincent Mastrogiacomo; McCoy Russell LLP

(57) ABSTRACT

System and methods for operating a vehicle that includes a boosted engine are described. In one example, a spark plug may be adjusted between two operating states to reduce a possibility of pre-ignition and spark plug fouling. A first operating state may be conducive to operating the engine at light loads. The first operating state may be conducive to operating the engine at higher loads.

8 Claims, 5 Drawing Sheets

SPARK PLUG FOR BOOSTED ENGINE

CROSS REFERENCE TO RELATED APPLICATION

The present application is a divisional of U.S. Non-Provisional patent application Ser. No. 18/047,525, entitled "SPARK PLUG FOR BOOSTED ENGINE", and filed on Oct. 18, 2022. The entire contents of the above-listed application are hereby incorporated by reference for all purposes.

FIELD

The present description relates to spark plugs for a boosted engine. The spark plugs may provide warmer operation during vehicle marshalling and colder operation during normal vehicle operation.

BACKGROUND AND SUMMARY

A boosted engine of a vehicle may be operated at high loads and low loads. There may be a possibility of spark plug fouling when the boosted engine is operated at low loads. Further, there may be a possibility of pre-ignition (e.g., at least partial combustion of an air-fuel mixture in an engine cylinder during an engine cycle before a spark is introduced to the engine cylinder during the engine cycle) when the boosted engine is operated at high loads. The type of spark plug that is installed in the engine cylinder may determine whether or not the spark plug fouls at lower loads and whether or not pre-ignition occurs in the engine cylinder at higher engine loads. In particular, if the spark plug is a "cold" spark plug (e.g., a spark plug that operates with a center electrode temperature that is relatively low), the spark plug may tend to foul when the engine is operated at lower engine loads. If the spark plug is a "hot" spark plug (e.g., a spark plug that operates with a center electrode temperature that is relatively high), the spark plug may tend to contribute to the possibility of pre-ignition within the engine cylinder.

The engine cylinder may be particularly susceptible to spark plug fouling during vehicle marshalling (e.g., moving and arranging a vehicle for transporting the vehicle to a customer or sales office) following vehicle manufacture. Marshalling the vehicle may include starting and stopping the engine one or more times where the engine operates at low loads (e.g., less than 0.5 load) for a short period of time before being stopped. Accordingly, it may be desirable to develop a spark plug that is suitable for vehicle marshalling and high engine loads.

The inventors herein have recognized the above-mentioned issues and have developed a spark plug, comprising: a metallic body including a crimp flange; a ceramic insulator; a center electrode; and a bias device arranged to position the ceramic insulator in a first position when the crimp flange is in a second position.

By adjusting a crimp flange of a spark plug, it may be possible to switch a spark plug from a lower heat dispersing state (e.g., a warmer operating spark plug) to a higher heat dispersing state (e.g., cooler operating spark plug). The spark plug may be changed from the lower heat dispersing state to the higher heat dispersing state after a vehicle and an engine that includes the spark plug has completed marshalling after the vehicle is manufactured and before the vehicle enters service or is sold to an end use customer.

The present description may provide several advantages. In particular, the approach may reduce a possibility of spark plug fouling. Further, the approach may reduce a possibility of pre-ignition within an engine. Additionally, the approach may be performed via a technician or automatically.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a boosted engine. The boosted engine may be operated with a spark plug that is in a lower heat dispersal state during vehicle marshalling. Once vehicle marshalling is complete, the boosted engine may be operated with the spark plug in a higher heat dispersal state. Operating the engine in this way may reduce a possibility of spark plug fouling during vehicle marshalling and reduce a possibility of pre-ignition during normal vehicle operation. The engine may be of the type shown in FIG. 1. The engine may include one or more spark plugs as shown in FIGS. 2-6. The engine may be operated according to the method of FIG. 7. FIGS. 2-6 are shown approximately to scale.

Figure 1:
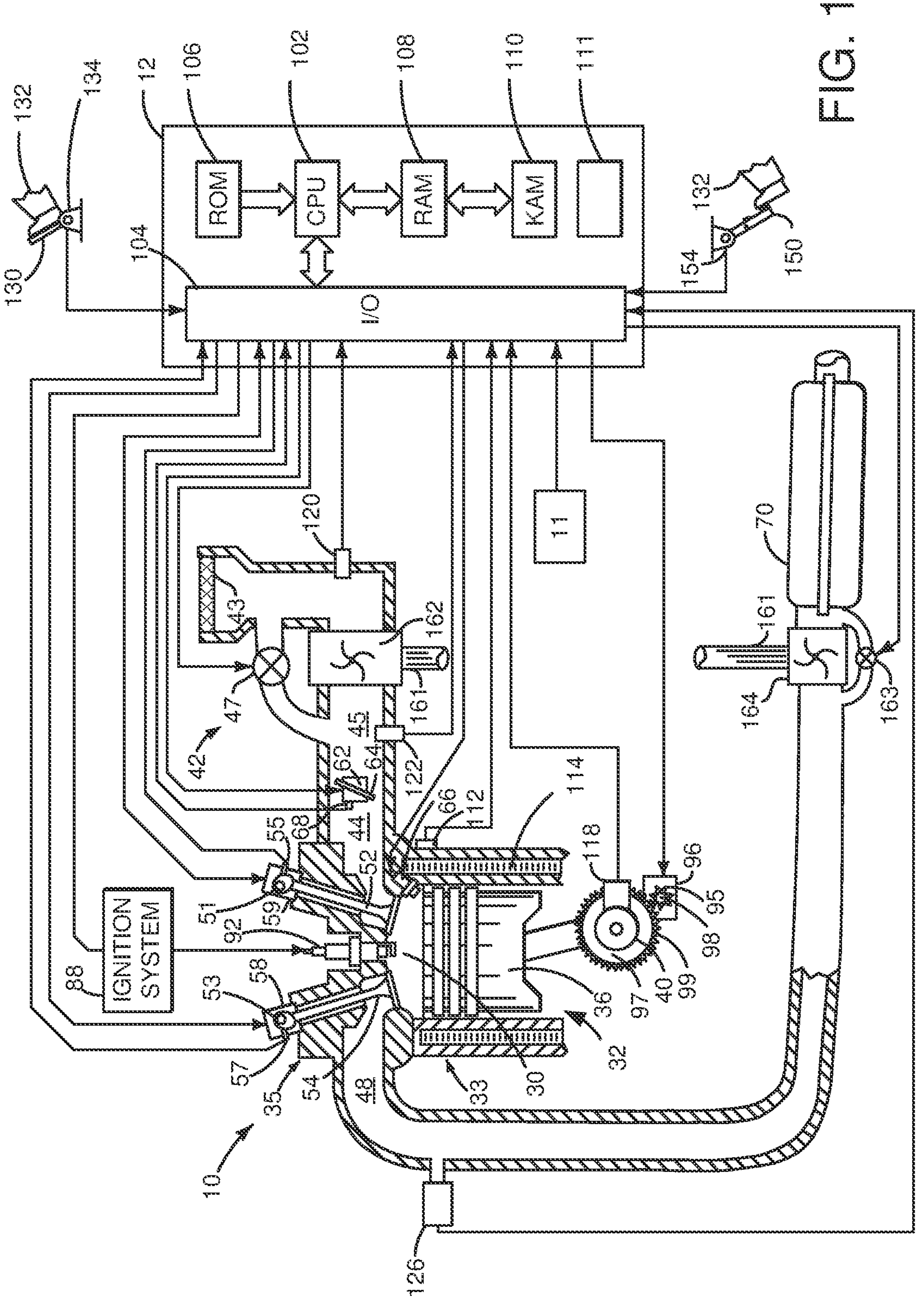
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIG. 1. Further, controller 12 employs the actuators shown in FIG. 1 to adjust engine operation based on the received signals and instructions stored in non-transitory memory of controller 12.

Engine 10 is comprised of cylinder head 35 and block 33, which include combustion chamber 30 and cylinder 32. Piston 36 is positioned therein and reciprocates via a connection to crankshaft 40. Flywheel 97 and ring gear 99 are coupled to crankshaft 40. Starter 96 (e.g., an optional low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into combustion chamber 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
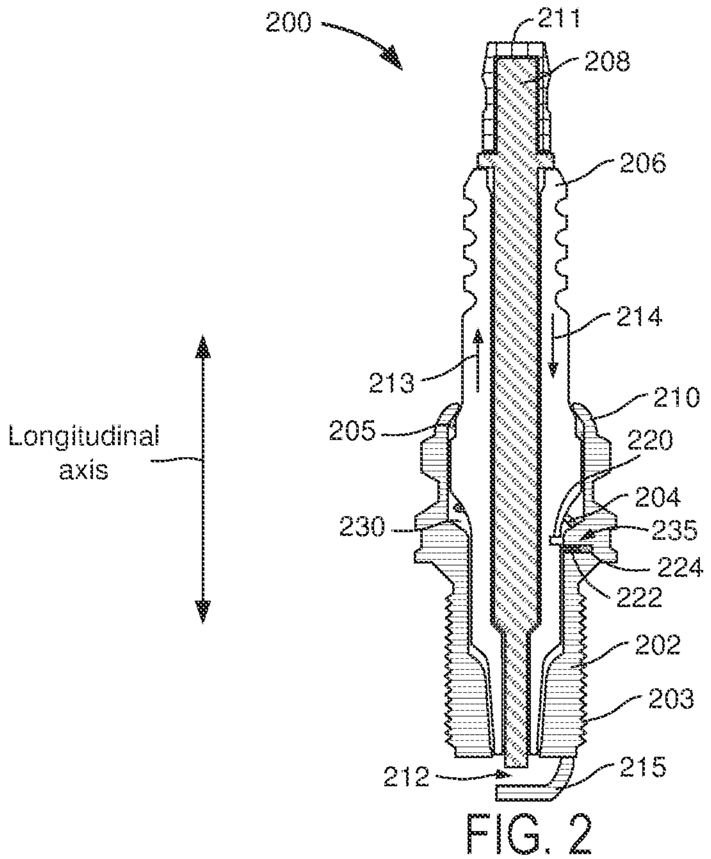
FIGS. 2 and 3 are cross sections of a first spark plug.

Referring now to FIG. 2, a schematic of a first example spark plug 200 is shown. Spark plug 200 may be the spark plug 92 that is shown in FIG. 1. Spark plug 200 is shown in cross section. Spark plug 200 is shown in a higher heat dispersion state for operating with a boosted engine at higher engine loads (e.g., engine load is indicative of air that is consumed by the engine and engine load may range from zero to 1 for engines that are not boosted and above one for boosted engines). The higher heat dispersion state includes a wider spark plug gap 212.

Spark plug 200 includes a body 202, a center electrode 208, and an insulator 206. The body 202 may be of metallic construction and the insulator 206 may be of ceramic construction. The center electrode 208 may be comprised of one or more materials including but not limited to copper. Cap 211 is coupled to center electrode 208.

Body 202 includes a crimp flange 210, a ground electrode 215, and threads 203 for mating spark plug 200 to a cylinder head. Insulator 206 is inserted into body 202 and insulator 206 may move relative to body 202 as indicated by arrow 214 according to bias forces.

In this example, two bias devices are shown. In particular, an upper spring 205 and a lower spring 204 are shown. The lower spring 204 may be constructed to deform in response to heating the spark plug so that shortly after vehicle marshalling, the upper spring causes insulator 206 to move in the direction of arrow 214. The lower spring 204 provides a force that may be greater than the force that is applied by the upper spring 205 and the lower spring 204 may provide a force to move insulator 206 in the direction that is indicated by arrow 213. In some examples, air that fills gap may operate as a spring to adjust the position of insulator 206 and center electrode 208 so that spark plug 200 operates in a higher heat dispersion state. In still other examples, bias may be provided via an annular or other shape of standoff that is inserted between insulator 206 and body 202. The standoff may deform or decompose when it is exposed to heat from the engine so that spark plug 200 changes from a higher heat dispersion state to a lower heat dispersion state in response to engine temperature increasing. In this example, crimp flange 210 is shown in a partially clamped position which allows spring 204 to support a larger distance or spark plug gap 212 between ground electrode 215 and center electrode 208.

Spark plug 200 is also shown with an optional locking mechanism 235. Locking mechanism 235 may include a cavity 220 in insulator 206, a pawl 222, and a bias device (e.g., spring) 224. Pawl 222 may be constructed with an annular, half moon, pin, or other known shape to engage cavity 220. In FIG. 2, locking mechanism 235 is shown in a not engaged position.

Figure 3:
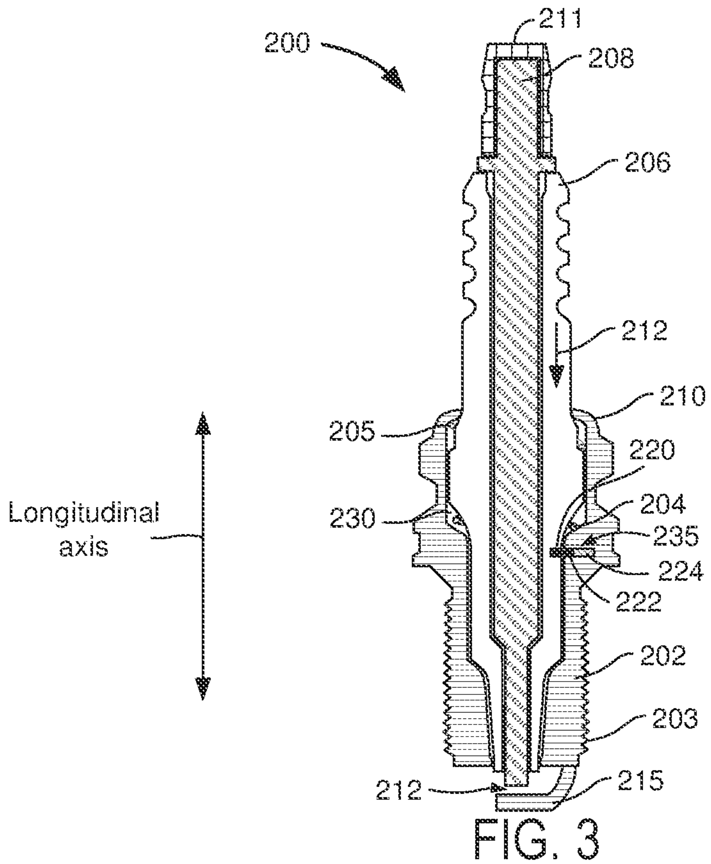

Referring now to FIG. 3, a schematic of the first example spark plug 200 that is shown in FIG. 2 is shown in a lower heat dispersion state. Spark plug 200 may be the spark plug 92 that is shown in FIG. 1. Spark plug 200 is shown in cross section. The lower heat dispersion state includes a narrower spark plug gap 212. The components of spark plug 200 are the same as those described in FIG. 2.

Spark plug 200 is shown in the lower heat dispersion state, which is engaged by applying a greater crimping force to crimp flange 210 to deform crimp flange 210 and compress spring 204. In addition, deforming the crimp flange 210 applies a force to move insulator 206 in the direction that is indicated by arrow 214. The additional force also allows locking mechanism 235 to engage and lock spark plug in the lower heat dispersion state. The spark plug gap 212 is reduced when spark plug 200 is engaged in the lower heat dispersion state.

Figure 4:
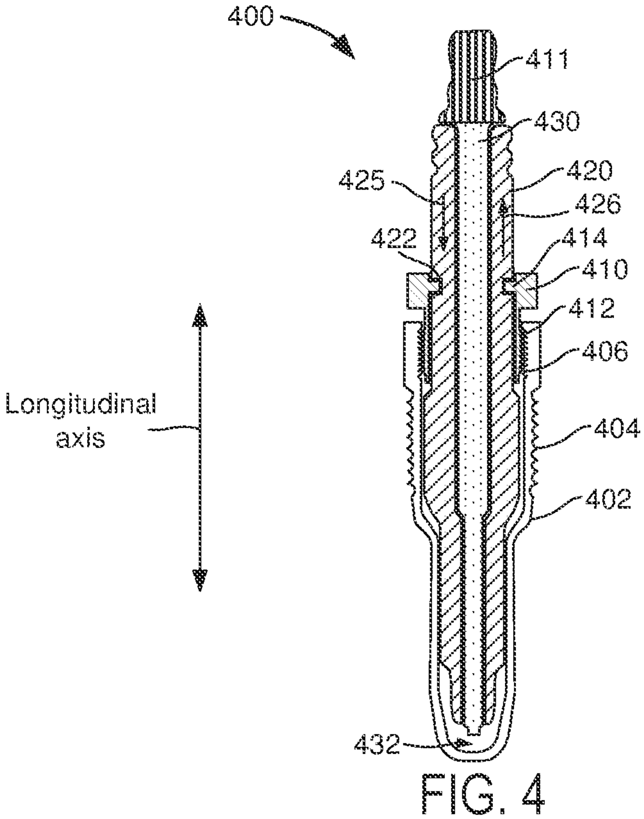
FIGS. 4 and 5 are cross sections of a second spark plug.

Referring now to FIG. 4, a schematic of a second example spark plug 400 is shown. Spark plug 400 may be the spark plug 92 that is shown in FIG. 1. Spark plug 400 is shown in cross section. Spark plug 400 is shown in a higher heat dispersion state for operating with a boosted engine at higher engine loads. The higher heat dispersion state includes a wider spark plug gap 432.

Spark plug 400 includes a lower body 402, an upper body 410, a center electrode 430, and an insulator 420. The lower body 402 and upper body 410 may be of metallic construction and the insulator 420 may be of ceramic construction. The center electrode 430 may be comprised of one or more materials including but not limited to copper.

Lower body 402 includes outer threads 404 and inner threads 406. Outer threads 404 are configured to engage a cylinder head (not shown). Inner threads 406 are configured to engage threads 412 of upper body 410. Insulator 420 is inserted into lower body 402 and upper body 410. Insulator 420 may move relative to lower body 402 as indicated by arrows 425 and 426 by rotating upper body 410. Rotating upper body 410 in a clockwise direction may decrease a distance of gap 432 and rotating upper body 410 in a counter clockwise direction may increase a distance of gap 432.

In this example, upper body 410 is of two piece construction and it includes an annular protrusion 414. Alternatively, insulator 420 may be press fit into upper body 410 and annular protrusion 414 may be omitted. Annular protrusion 414 is inserted into cavity 422 which encircles insulator 420. The annular protrusion 414 and the cavity 422 allow upper body 410 to lift and lower insulator 420 and center electrode 430 in a longitudinal direction of insulator 420 as indicated by arrows 425 and 426 when upper body 410 is rotated with respect to lower body 402. During vehicle marshalling, upper body 410 may be oriented to provide a greater distance at gap 432. After vehicle marshalling, upper body 410 may be oriented to provide a smaller distance at gap 432. In this example, upper body 410 is shown in a position that allows center electrode 430 and lower body 402, which operates as a ground electrode, to support a larger distance or gap 432.

Figure 5:
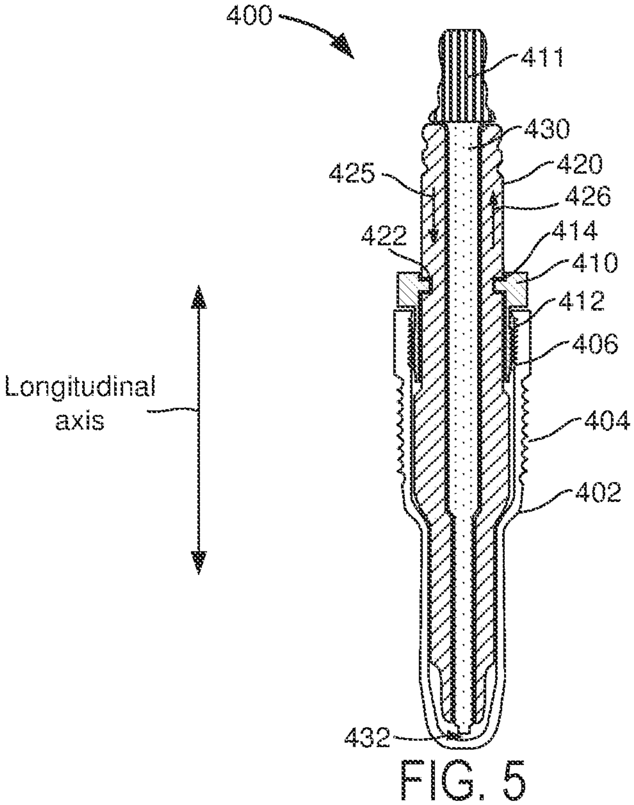

Referring now to FIG. 5, a schematic of the second example spark plug 400 that is shown in FIG. 4 is shown in a lower heat dispersion state. Spark plug 2400 may be the spark plug 92 that is shown in FIG. 1. Spark plug 400 is shown in cross section. The lower heat dispersion state includes a narrower spark plug gap 432. The components of spark plug 400 are the same as those described in FIG. 4.

Spark plug 400 is shown in the lower heat dispersion state, which is engaged by rotating upper body 410 in a clockwise direction with respect to lower body 402. The gap 432 is reduced when spark plug 400 is engaged in the lower heat dispersion state. The lower heat dispersion state may be engaged when marshalling a vehicle that includes the engine and spark plug 400.

Figure 6:
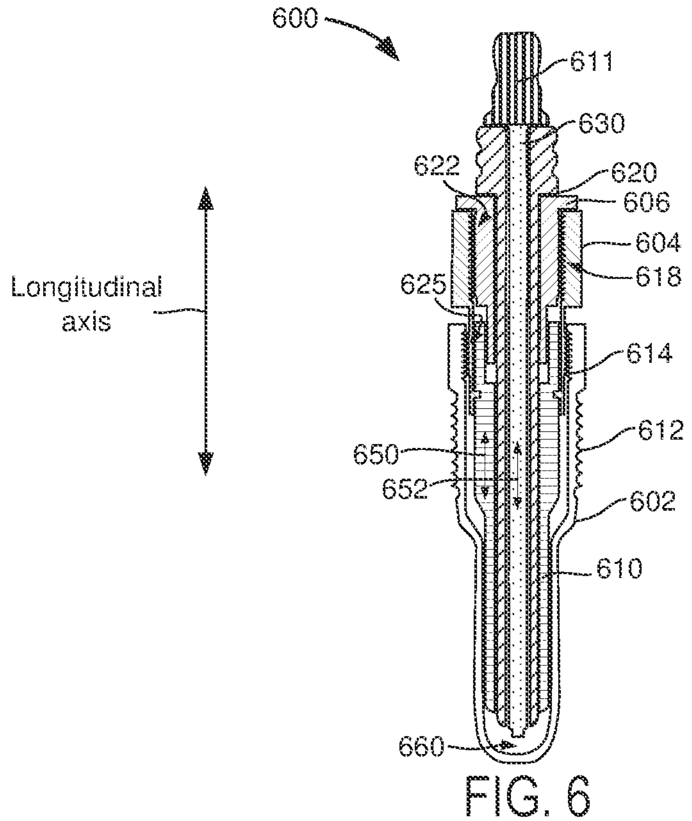
FIG. 6 is a cross section of a third spark plug.

Turning now to FIG. 6, a schematic of a third example spark plug 600 is shown. Spark plug 600 may be the spark plug 92 that is shown in FIG. 1. Spark plug 600 is shown in cross section. Spark plug 600 is shown in a higher heat dispersion state for operating with a boosted engine at higher engine loads. The higher heat dispersion state is engaged by adjusting second ceramic insulator 610 toward the spark plug gap 660.

Spark plug 600 includes a lower body 602, an intermediate body 604, an upper body 606, and a center electrode 630. The center electrode 630 is partially covered in a longitudinal direction via a first ceramic insulator 620. The first ceramic insulator 620 is at least partially covered in a longitudinal direction via a second ceramic insulator 610. The first and second ceramic insulators may be cylindrical in form. Lower body 602, intermediate body 604, and upper body 606 may be of metallic construction. The center electrode 630 may be comprised of one or more materials including but not limited to copper.

Lower body 602 includes outer threads 612 and inner threads 614. Outer threads 612 are configured to engage a cylinder head (not shown). Inner threads 614 are configured to engage outer threads 625 of intermediate body 604. Outer threads 622 of intermediate body 604 are configured to engage inner threads 618 of upper body 606. Intermediate body 604 may be rotated to move second ceramic insulator 610 up and down in a longitudinal direction relative to lower body 602 as indicated by arrow 650. Upper body 606 may be rotated to move first ceramic insulator 620 up and down in a longitudinal direction relative to intermediate body 604 as indicated by arrow 652.

In this example, intermediate body 604 is of two piece construction. The lower and upper bodies are of one piece construction. The respective ceramic insulators may be pressed into the upper and intermediate bodies. In other examples, the intermediate body may be raised and lowered with respect to the lower body via electric or hydraulic actuators.

The spark plugs of FIGS. 2-6 provide for a spark plug, comprising: a metallic body including a crimp flange; a ceramic insulator; a center electrode; and a bias device arranged to position the ceramic insulator in a first position when the crimp flange is in a second position. In a first example, the spark plug includes where the ceramic insulator is in a second position when the crimp flange is in a third position. In a second example that may include the first example, the spark plug includes where the bias device is a spring. In a third example that may include one or both of the first and second examples, the spark plug further comprises a locking mechanism configured to restrict motion of the ceramic insulator relative to the metallic body. In a fourth example that may include one or more of the first through third examples, the spark plug includes where the ceramic insulator at least partially covers the center electrode, and where the locking mechanism includes a cavity in the ceramic insulator. In a fifth example that may include one or more of the first through fourth examples, the spark plug includes where the locking mechanism includes a spring. In a sixth example that may include one or more of the first through fifth examples, the spark plug includes where the bias device deforms with increasing temperature. In a seventh example that may include one or more of the first through sixth examples, the spark plug includes where the bias device impinges on the ceramic insulator and the metallic body.

The spark plugs of FIGS. 2-6 provide for a spark plug, comprising: a metallic body; a first ceramic insulator at least partially covering a center electrode; and a second ceramic insulator at least partially covering the first ceramic insulator. In a first example, the spark plug includes where the second ceramic insulator is movable with respect to a longitudinal direction of the first ceramic insulator. In a second example that may include the first example, the spark plug further comprising an intermediate body to adjust a longitudinal position of the second ceramic insulator. In a third example that may include one or both of the first and second examples, the spark plug includes where the second ceramic insulator is formed in a cylindrical shape. In a fourth example that may include one or more of the first through third examples, the spark plug further comprises an upper body configured to adjust a longitudinal position of the first ceramic insulator.

Figure 7:
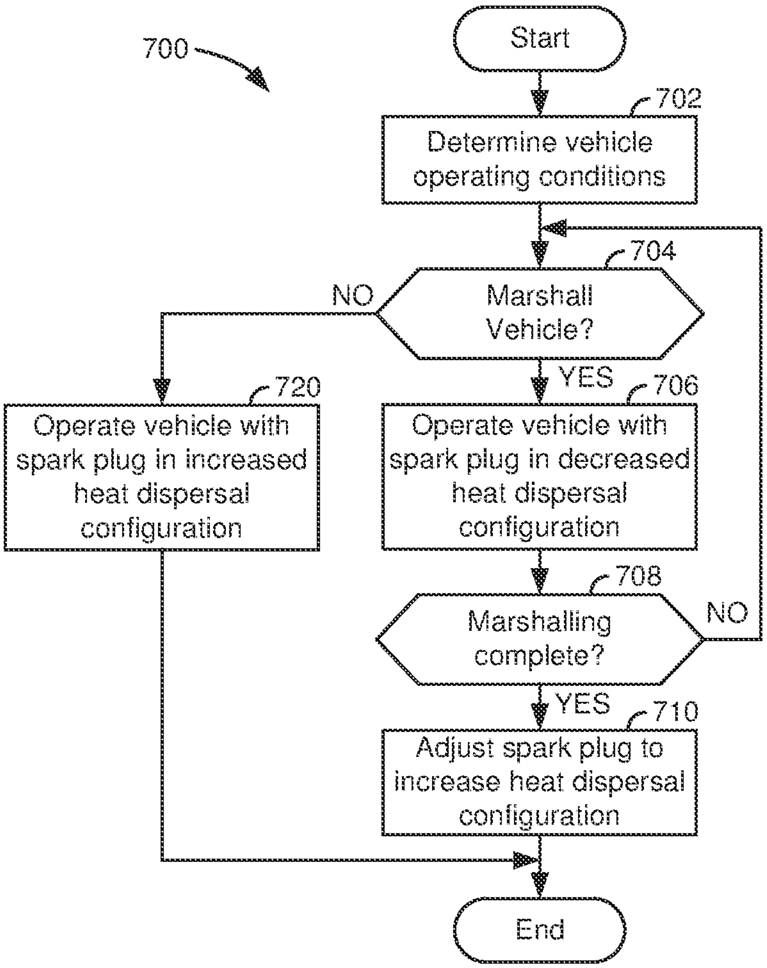
FIG. 7 shows a method for operating an engine.

Referring now to FIG. 7, a flow chart of a method for operating an engine that includes a spark plug that may be operated in a lower heat dispersal state or a higher heat dispersal state is shown. The method of FIG. 7 may be applied to the system of FIG. 1. The method of FIG. 7 may be performed automatically via spark plug components or via a technician. Further, a controller may perform at least a portion of method 700 via changing operating statues of a human/machine interface. Operating states of an engine's spark plugs may be transformed automatically or via the technician.

At 702, method 700 determines vehicle operation conditions. Operating conditions may include but are not limited an actual total amount of time that an engine of the vehicle has been running (e.g., rotating and combusting fuel) since the vehicle was manufactured, engine temperature, the vehicle's geographical position, and engine load. Method 700 proceeds to 704.

At 704, method 700 judges whether or not marshalling of the vehicle has been completed. Method 700 may judge that marshalling of the vehicle is complete after the vehicle has left a manufacturing facility, engine temperature has reached a threshold operating temperature, the vehicle has reached a destination (e.g., sales office, user location, etc.), or other condition that may be indicative of vehicle marshalling being complete. If method 700 judges that vehicle marshalling is complete, the answer is yes and method 700 proceeds to 706. Otherwise, the answer is no and method 700 proceeds to 720.

At 720, method 700 operates the vehicle with the engine's spark plugs being in an increased heat dispersal state (e.g., a shorter spark plug gap and/or the ceramic that covers the central electrode being moved away from the spark plug gap). The increased heat dispersal state may allow the engine to operate at higher engine loads with a lower possibility of pre-ignition. Method 700 may prompt a user or technician via a human/machine interface to adjust the spark plug to an increased heat dispersal state, or alternatively, the spark plug's state may change due to engine temperature exceeding a threshold temperature or engine operating duration exceeding a threshold duration. Once the spark plug's operating state is changed, the engine is operated with the spark plug in the increased heat dispersal state. Method 700 proceeds to exit.

At, 706, method 700 operates the vehicle with the engine's spark plugs being in a decreased heat dispersal state (e.g., a larger spark plug gap and/or the ceramic that covers the central electrode being moved toward the spark plug gap). The decreased heat dispersal state may allow the engine to operate at lower engine loads with a lower possibility of spark fouling (e.g., soot accumulation of the spark plug). Method 700 may indicate to a user or technician via the human/machine interface that the spark plugs are operating in a decreased heat dispersal state. The engine may be operated with the spark plug in the decreased heat dispersal state while marshalling the vehicle. Method 700 proceeds to 708.

At 708, method 700 judges whether or not vehicle marshalling is complete. Method 700 may judge that vehicle marshalling is compete if the vehicle has operated for longer than a threshold amount of time since vehicle manufacture, engine temperature has exceeded a threshold temperature, or the vehicle has left a vehicle manufacturing location. If method 700 judges that vehicle marshalling is complete, the answer is yes and method 700 proceeds to 710. Otherwise, the answer is no and method 700 returns to 704.

At 710, method 700 may prompt a user or technician via a human/machine interface to adjust the spark plug to an increased heat dispersal state, or alternatively, the spark plug's state may change due to engine temperature exceeding a threshold temperature or engine operating duration exceeding a threshold duration. For example, a spring or device within the spark plug may deform to allow the spark plug to change to the increased heat dispersal state. Once the spark plug's operating state is changed, the engine may be operated with the spark plug in the increased heat dispersal state. Method 700 proceeds to exit.

In this way, an operating state of a spark plug may be adjusted once vehicle marshalling is complete so that a possibility of spark plug fouling may be reduced when the vehicle is being marshalled. Once the spark plug state is adjusted, the engine may be operated at higher loads with a reduced possibility of pre-ignition.

The method of FIG. 7 provides for an engine operating method, comprising: operating an engine with a spark plug in a first heat dispersal state during engine operating conditions when an engine load is expected to be less than a threshold load, wherein the first heat dispersal state is produced via a biasing device applying a force between a metallic body of the spark plug and a ceramic insulator of the spark plug; and operating the engine with the spark plug in a second heat dispersal state during engine operating conditions when the engine load is expected to be greater than the threshold load. In a first example, the method includes where the bias device is a spring. In a second example that may include the first example, the method further comprises locking the spark plug in the second heat dispersal state via adjusting a crimp flange of the spark plug. In a third example that may include one or both of the first and second examples, the method further comprises locking the spark plug in the second heat dispersal state via a locking device that constrains movement between the metallic body of the spark plug and the ceramic insulator of the spark plug. In a fourth example that may include one or more of the first through third examples, the method includes where the locking is achieved via moving the ceramic insulator of the spark plug. In a fifth example that may include one or more of the first through fourth examples, the method includes where the engine load is expected to be less than a threshold load is during vehicle marshalling. In a sixth example that may include one or more of the first through fifth examples, the method includes where the engine load is expected to be greater than a threshold load is subsequent to vehicle marshalling.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A spark plug, comprising:
- a metallic body including a crimp flange;
- a ceramic insulator;
- a center electrode; and
- a bias device arranged to position the ceramic insulator in a first position when the crimp flange is in a second position.

2. The spark plug of claim 1, where the ceramic insulator is in a third position when the crimp flange is in a fourth position.

3. The spark plug of claim 1, where the bias device is a spring.

4. The spark plug of claim 1, further comprising a locking mechanism configured to restrict motion of the ceramic insulator relative to the metallic body.

5. The spark plug of claim 4, where the ceramic insulator at least partially covers the center electrode, and where the locking mechanism includes a cavity in the ceramic insulator.

6. The spark plug of claim 5, where the locking mechanism includes a spring.

7. The spark plug of claim 1, where the bias device deforms with increasing temperature.

8. The spark plug of claim 1, where the bias device impinges on the ceramic insulator and the metallic body.

* * * * *